United States Patent [19]
Chung

[11] Patent Number: 5,519,570
[45] Date of Patent: May 21, 1996

[54] DETACHABLE KEYBOARD

[75] Inventor: Stephen Chung, Taipei Hsien, Taiwan

[73] Assignee: Silitek Corporation, Taipei, Taiwan

[21] Appl. No.: 330,066

[22] Filed: Oct. 26, 1994

[51] Int. Cl.$^6$ ................................ B41J 5/10; G09G 3/02
[52] U.S. Cl. .......................... 361/680; 345/168; 400/472; 400/489; 400/82
[58] Field of Search .......................... 361/680; 345/168; 400/82, 88, 482–486, 488, 489

[56] References Cited

U.S. PATENT DOCUMENTS

| | | | |
|---|---|---|---|
| 4,735,520 | 4/1988 | Suzuki et al. | 400/488 |
| 5,067,834 | 11/1991 | Szmanda et al. | 400/82 |
| 5,073,050 | 12/1991 | Andrews | 400/82 |
| 5,141,343 | 8/1992 | Roylance et al. | 400/472 |
| 5,318,367 | 6/1994 | Braun et al. | 400/488 |
| 5,361,082 | 11/1994 | Chung | 345/168 |
| 5,388,921 | 2/1995 | Chung | 400/472 |

*Primary Examiner*—Leo P. Picard
*Assistant Examiner*—Lynn D. Hendrickson
*Attorney, Agent, or Firm*—Browdy and Neimark

[57] ABSTRACT

A detachable keyboard including a key pad, an upper frame coupled to the key pad at the bottom, an intermediate shell fastened to the upper frame at the bottom, a lower frame coupled to the intermediate shell at the bottom, a bottom shell fastened to the lower frame at the bottom, an adjusting screw, an actuating member coupled to the adjusting screw, and a lifting member having one end pivotably connected to the actuating member and an opposite end extended out of an opening on the upper frame and pivotably coupled to the key pad, wherein the intermediate frame can be moved along curved sliding grooves on the lower frame to adjust the horizontal position of the key pad; the actuating member can be moved forwards or backwards by turning the adjusting screw in either direction, causing the lifting member to lift or lower the key pad.

2 Claims, 6 Drawing Sheets

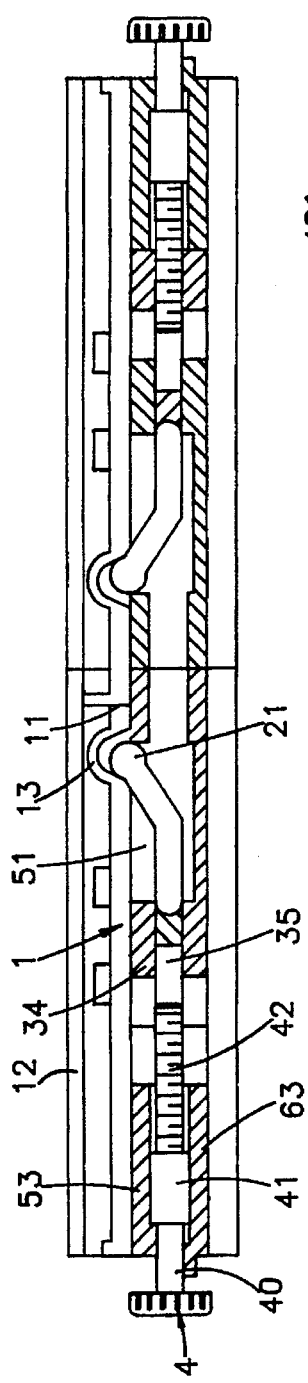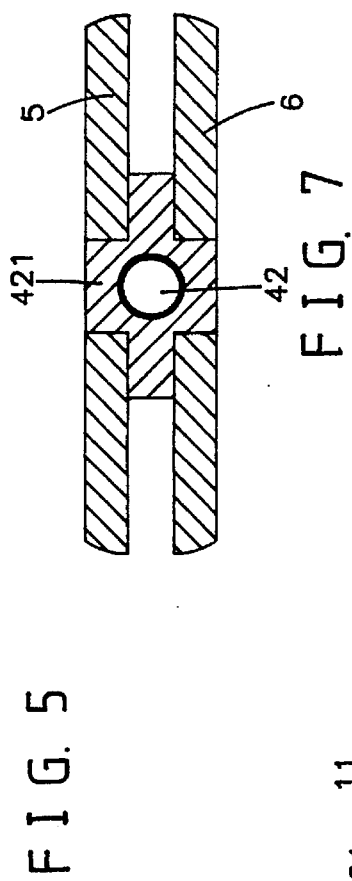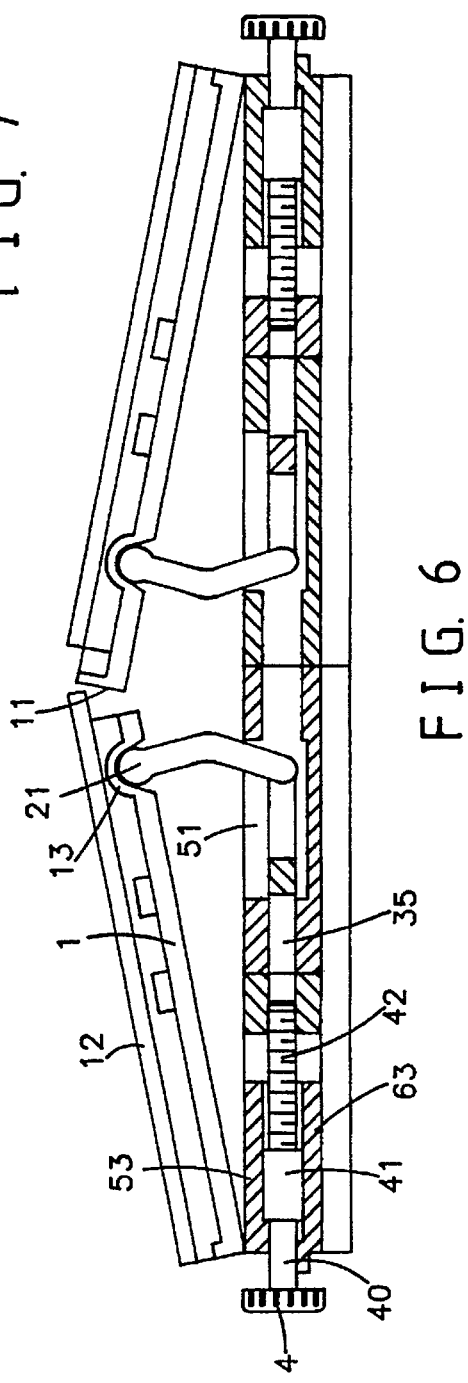

DETACHABLE KEYBOARD

BACKGROUND OF THE INVENTION

The present invention relates to a detachable keyboard which consists of two symmetrical parts that can moved relative to each other horizontally as well as vertically.

A variety of electronic apparatus are widely used in different fields and operated by keyboards. Regular keyboards for this purpose are commonly not detachable. Therefore, a keyboard operator must adapt oneself to the keyboard during the operation, causing the spine to ache easily.

FIG. 1 shows a detachable folding keyboard device which eliminates the aforesaid problem. This keyboard device comprises a base frame unit consisting of a left base frame and a right base frame, a keyboard unit consisted of a left keyboard and a right keyboard respectively supported on the left and right base frames, and connecting devices connected between the left and right frames for permitting the left and right keyboards to be end matched, or to be set apart and spread out like a fan, or to be folded up. This structure of detachable folding key board device is functional, however, it is not easy to adjust the positions of the two keyboards.

SUMMARY OF THE INVENTION

It is one object of the present invention to provide a detachable keyboard which consists of two symmetrical parts that can be adjusted relative to each other horizontally as well as vertically. It is another object of the present invention to provide a detachable keyboard which is simple in structure and inexpensive to manufacture.

According to one aspect of the present invention, the detachable keyboard comprises a vertical adjustment mechanism. The vertical adjustment mechanism comprises a key pad, an upper frame coupled to the key pad at the bottom, an intermediate shell fastened to the upper frame at the bottom, an adjusting screw, an actuating member coupled to the adjusting screw, and a lifting member having one end pivotably connected to the actuating member and an opposite end extended out of an opening on the upper frame and pivotably coupled to the key pad, wherein the actuating member can be moved forwards or backwards by turning the adjusting screw in either direction, causing the lifting member to lift or lower the key pad.

According to another aspect of the present invention, the detachable keyboard further comprises a horizontal adjustment mechanism comprised of a lower frame, which has a plurality of curved sliding grooves, a plurality of holes respectively disposed in the curved sliding grooves at one end, and a retainer spring, a plurality of guide blocks raised from the intermediate frame and moved in the curved sliding grooves of the lower frame, a toothed locating block raised from the intermediate frame and engaged with the retainer spring; and a bottom shell fastened to the lower frame at a bottom by screws and having a plurality of stop blocks respectively fitted into the holes on the lower frame. Therefore, the intermediate frame can be moved on the lower frame horizontally along the curved sliding grooves to adjust the horizontal position of the key pad.

BRIEF DESCRIPTION OF THE DRAWINGS

FIG. 5 is a sectional elevation of the detachable keyboard shown in FIG. 2;

FIG. 6 is similar to FIG. 5 but showing the key pads of the two symmetrical units of the detachable keyboard lifted;

FIG. 7 is a sectional view taken on part of FIG. 5, showing the raised portions of the screw holder of the actuating member retained between the upper frame and the intermediate frame;

DETAILED DESCRIPTION OF THE PREFERRED EMBODIMENT

Figure 1:
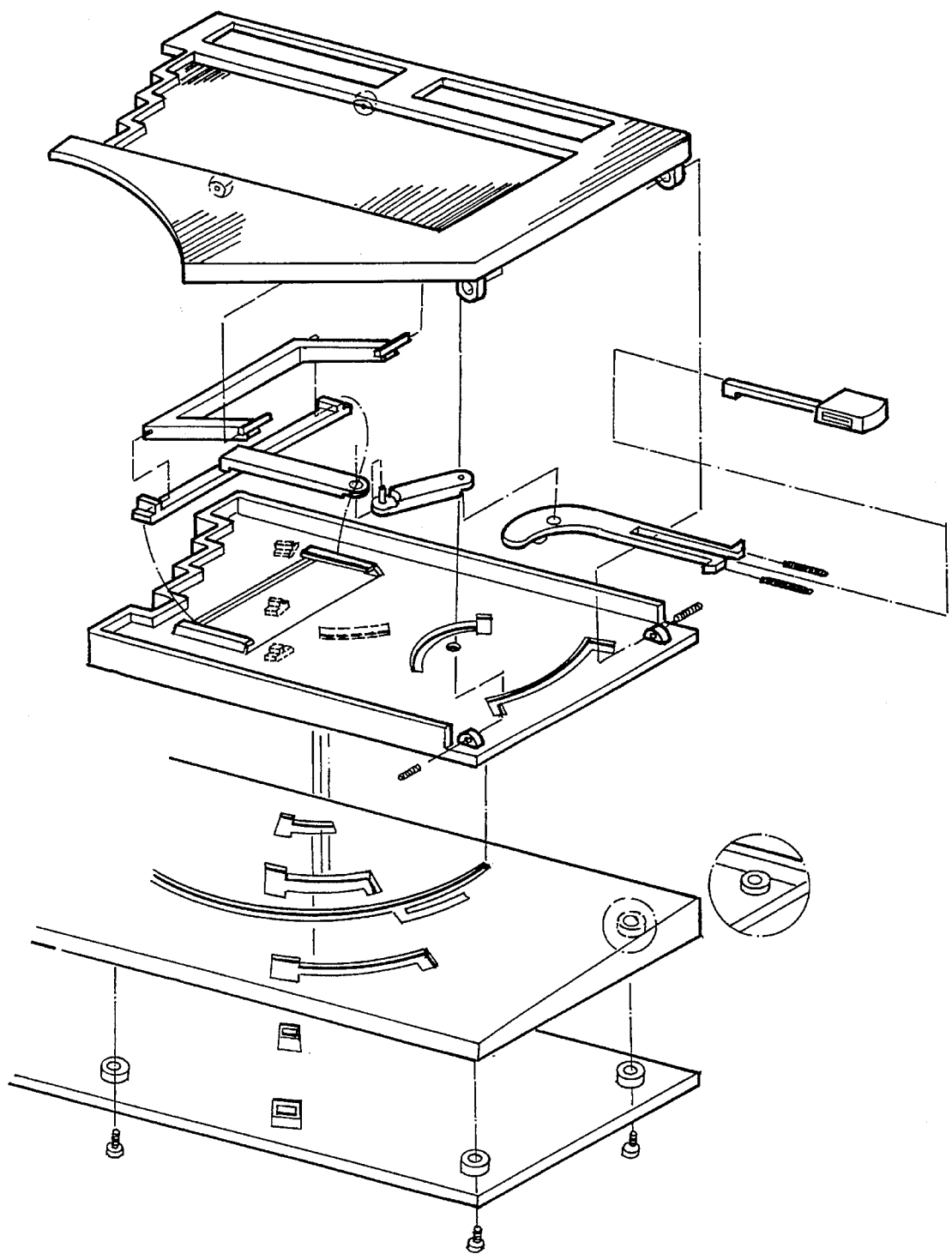
FIG. 1 is an exploded view of a detachable folding keyboard device according to the prior art.
Figure 2:
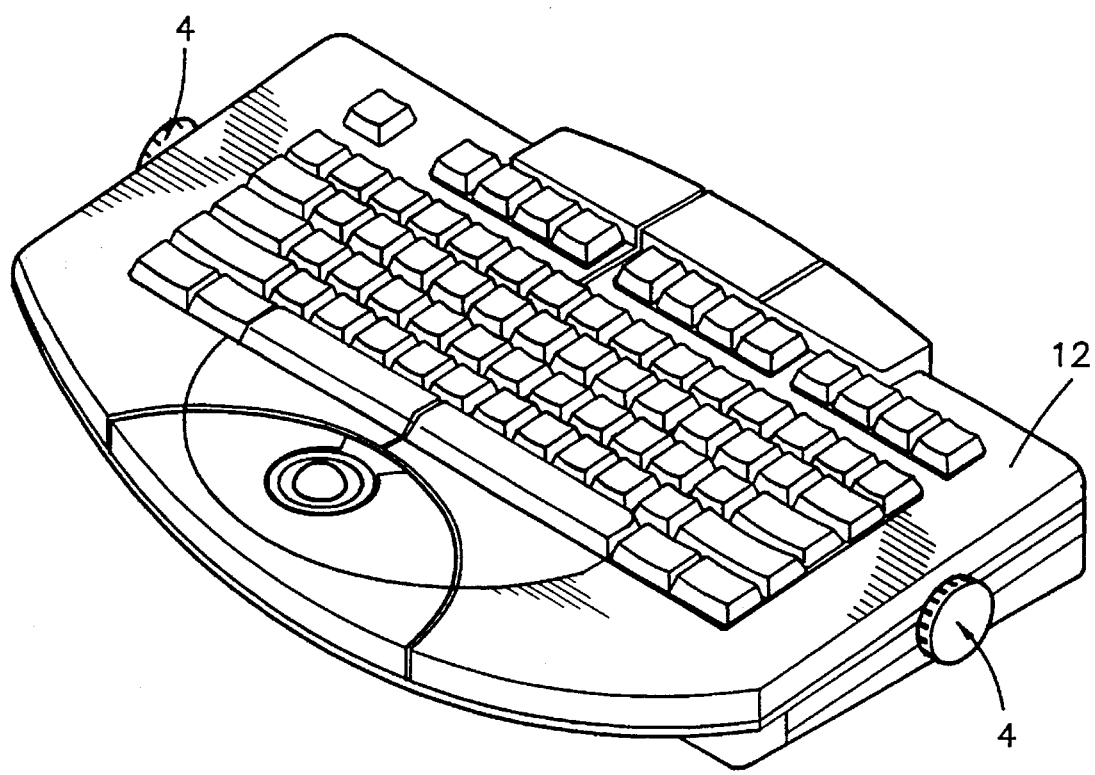
FIG. 2 is an elevational view of a detachable keyboard according to the present invention.
Figure 3:
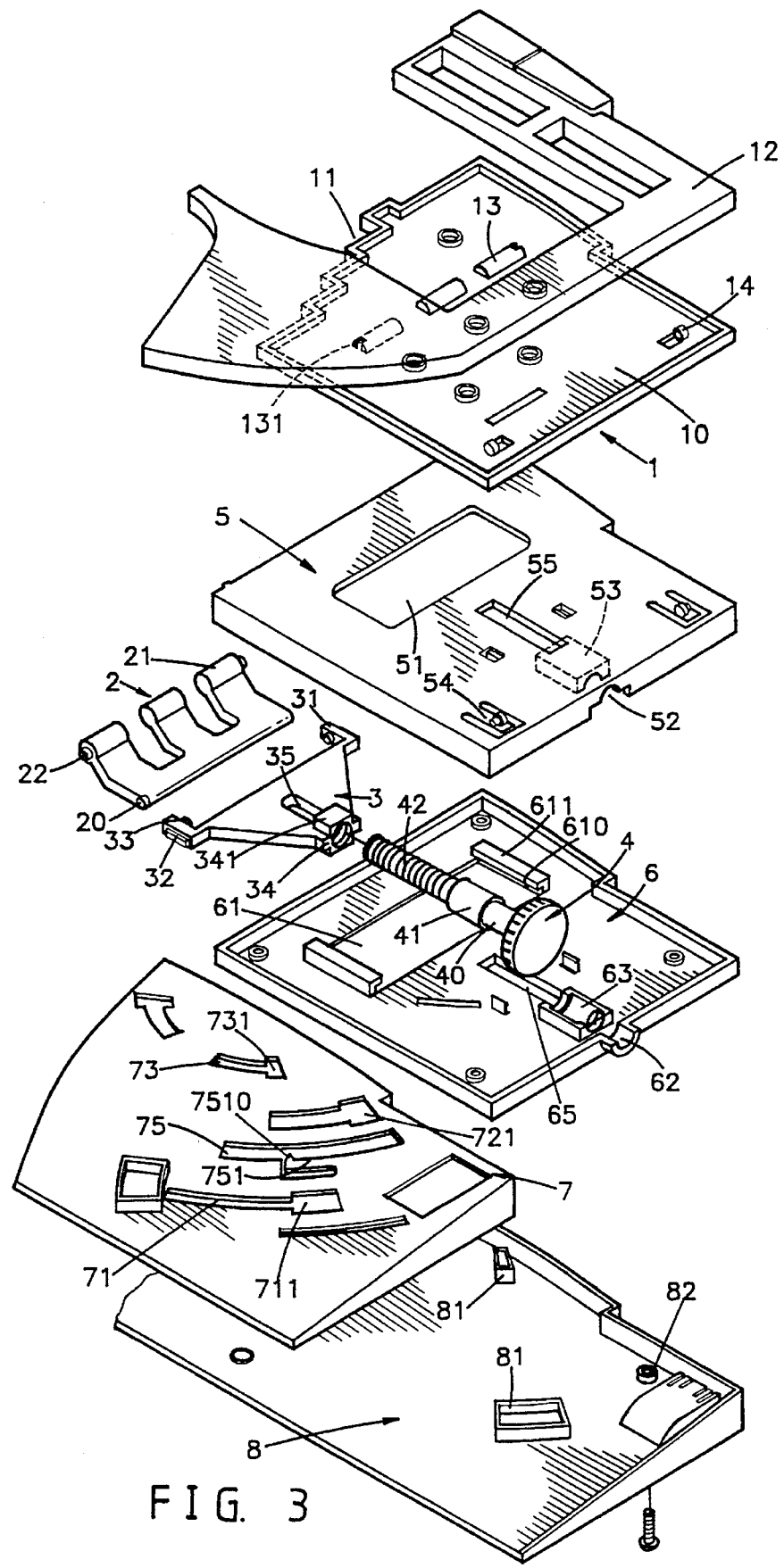
FIG. 3 is an exploded view of the detachable keyboard shown in FIG. 2.

FIG. 2 shows a detachable keyboard according to the present invention. As illustrated, the keyboard is comprised of two symmetrical units arranged side by side. FIG. 3 is an exploded view of one unit of the keyboard shown in FIG. 2. As illustrated, an unit of the detachable keyboard is comprised of a key pad 1, a lifting member 2, an actuating member 3, an adjusting screw 4, an upper frame 5, an intermediate frame 6, a lower frame 7, and a bottom shell 8. The intermediate frame 6, the lower frame 7, and the bottom shell 8 form a horizontal adjustment mechanism for adjusting the position of the key pad 1 horizontally. The lifting member 2, the actuating member 3, the adjusting screw 4, the upper frame 5, and the intermediate frame 6 form a vertical adjustment mechanism for adjusting the position of the key pad 1 vertically.

The key pad 1 comprises a key switch mounting plate 10, and a cover shell 12 covered on the key switch mounting plate 10. The key switch mounting plate 10 has a coupling portion 11 fitting the coupling portion of the key switch mounting plate of the other unit of the keyboard, a plurality of connecting blocks 13 with pivot holes 131, and a plurality of retaining holes 14.

The lifting member 2 comprises two pivot holes 20 longitudinally aligned and bilaterally disposed at one end, a forked coupling portion 21 at an opposite end, and two pivot pins 22 disposed at two opposite sides of the forked coupling portion 21.

The actuating member 3 comprises two guide blocks 31 spaced at one end, a screw holder 34 at an opposite end, an elongated slot 35 extended from the screw holder 34. The guide blocks 31 have each a pivot pin 33 at an inner side inserted in one pivot hole 20 on the lifting member 2, and a track 32 at an outer side. The screw holder 34 has two raised portions 341 at two opposite sides.

The adjusting screw 4 comprises a plain rod section 40 at one end, a screw rod section 42 at an opposite end, and a collar 41 connected between the plain rod section and the screw rod section 42. The screw rod section 42 of the adjusting screw 4 is threaded into the screw holder 34 and the elongated slot 35.

The intermediate frame 6 comprises a half-round axle holder 62 at one end, which receives the plain rod section 40 of the adjusting screw 4, a recess 61 spaced from the half-round axle holder 62, a locating groove 63 near the half-round axle holder 62, which receives the collar 41 of the adjusting screw 4, a longitudinal groove 65 extended from the locating groove 63 toward the recess 61, and two angle rails 611 raised from two opposite sides of the recess 61 and defining a respective sliding way 610.

The upper frame 5 is fastened to the intermediate frame 6 by screws (not shown) and covered over the adjusting screw 4 and the actuating member 3, having an opening 51, through which the lifting member 2 extends out of the upper frame 5, a half-round axle holder 52, which receives the plain rod section 40 of the adjusting screw 4, a locating groove 53, which receives the collar 41 of the adjusting screw 4, a longitudinal groove 55 extended from the locating groove 53 toward the opening 51, and two retainer rods 54 respectively fastened to the retaining holes 14 on the key switch mounting plate 10. When the actuating member 3 is connected to the adjusting screw 4, the tracks 32 of the guide blocks 31 are moved in the sliding ways 610, and the raised portions 341 of the screw holder 34 of the actuating member 3 are moved along the longitudinal grooves 55 and 65 (see also FIGS. 4 and 7).

Figure 8:
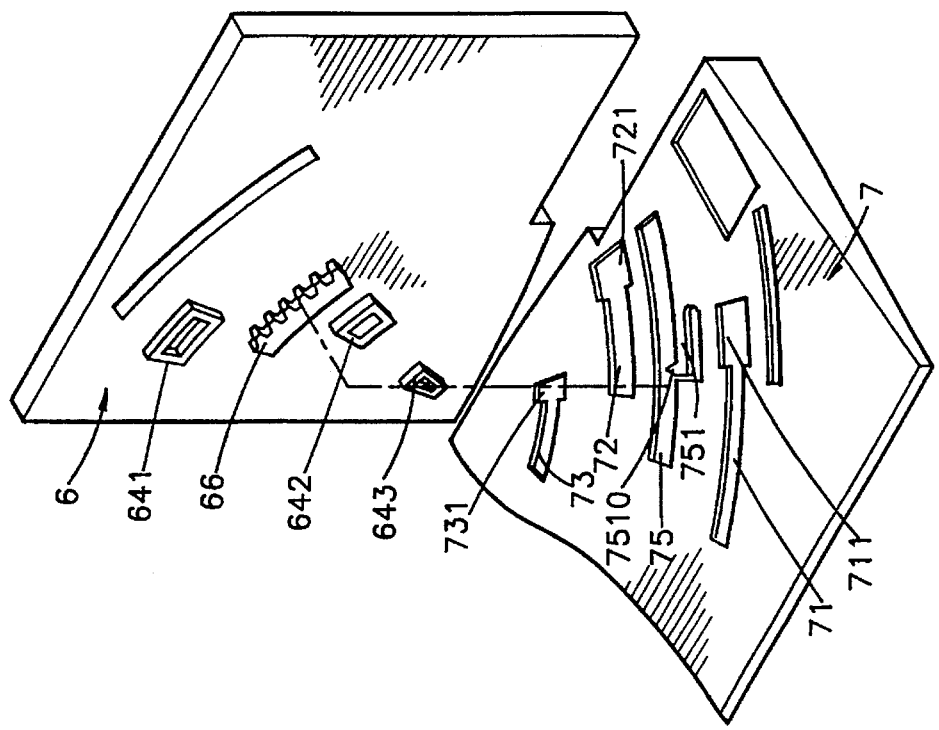
FIG. 8 is an exploded view of the horizontal adjustment mechanism of the detachable keyboard shown in FIG. 2, showing the back side of the intermediate frame and the top side of the lower frame.

The back side of the intermediate frame 6 is coupled to the lower frame 7 (see FIG. 8). The intermediate frame 6 further comprises a first guide block 641, a second guide block 642, a third guide block 643, and a toothed locating block 66 respectively raised from the back side thereof. The lower frame 7 comprises a first curved sliding groove 71, a second curved sliding groove 72, a third curved sliding groove 73, a guide groove 75, and a retainer spring 751 having a pawl 7510. The curved sliding grooves 71, 72, and 73 have a respective expanded hole 711, 721, or 731 at one end. The guide blocks 641, 642, and 643 are respectively inserted into the expanded holes 711, 721, and 731, and then moved into the curved sliding grooves 71, 72, and 73. At the same time, the toothed locating block 66 is inserted into the guide groove 75 and engaged with the pawl 7510 of the retainer spring 751.

The bottom shell 8 comprises two stop blocks 81 respectively inserted into the expanded holes 711 and 731 to stop the guide blocks 641 and 643 in the curved sliding grooves 711 and 731, and a plurality of screw holders 82 respectively connected to the lower frame 7 by screws.

Figure 4:
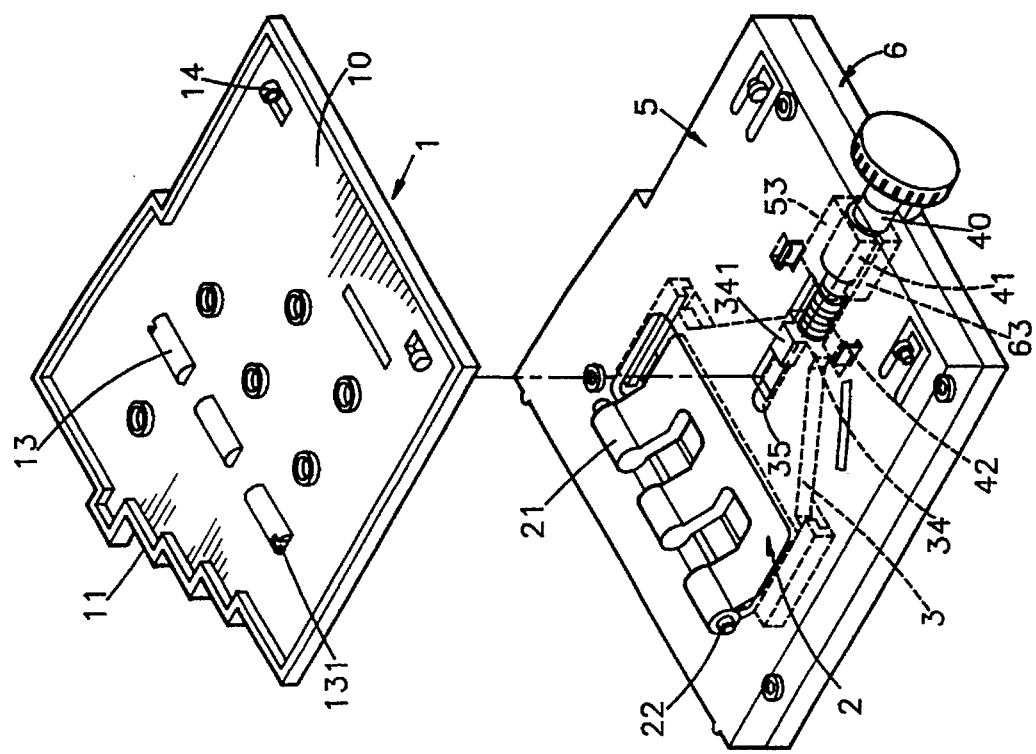
FIG. 4 is a perspective assembly view of the horizontal adjustment mechanism of the detachable keyboard of FIG. 2.

The assembly process of the present invention is outlined hereinafter with reference to FIGS. 4 and 5. When the pivot pins 33 of the guide block 31 of the actuating member 3 are respectively inserted into the pivot holes 20 of the lifting member 2, the screw rod section 421 of the adjusting screw 4 is threaded into the screw holder 34 and elongated slot 35 of the actuating member 3, then the lifting member 2 is placed in the recess 61 with the forked coupling portion 21 extended out of the opening 51 of the upper frame 5, permitting the pivot pins 22 to be inserted into the pivot holes 131 on the connecting blocks 13 of the key switch mounting plate 10 respectively, and then the upper frame 5 is fastened to the intermediate frame 6, permitting the raised portions 341 of the screw holder 34 and the collar 41 and plain rod section 40 of the adjusting screw 4 to be respectively disposed in the longitudinal grooves 65 and 55, the locating grooves 63 and 53, and the half-round axle holders 62 and 52. Then, the intermediate frame 6 is fastened to the lower frame 7, permitting the guide blocks 641, 642, and 643 to be respectively inserted into the curved sliding grooves 71, 72, and 73 and permitting the toothed locating block 66 to be inserted into the guide groove 75 and engaged with the pawl 7510 of the retainer spring 751. Then, the bottom shell 8 is fastened to the lower frame 7, permitting the stop blocks 81 to be respectively inserted into the expanded holes 711 and 731.

Figure 9:
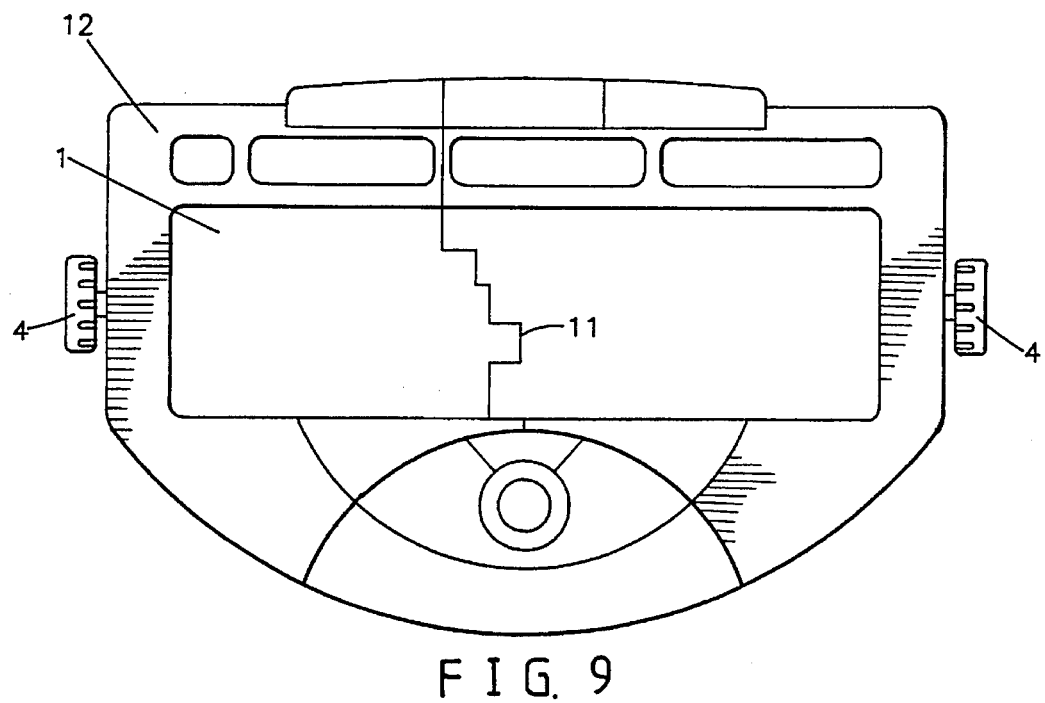
FIG. 9 is a plain view of the detachable keyboard of FIG. 2, showing the key pads of the two symmetrical units end matched.
Figure 10:
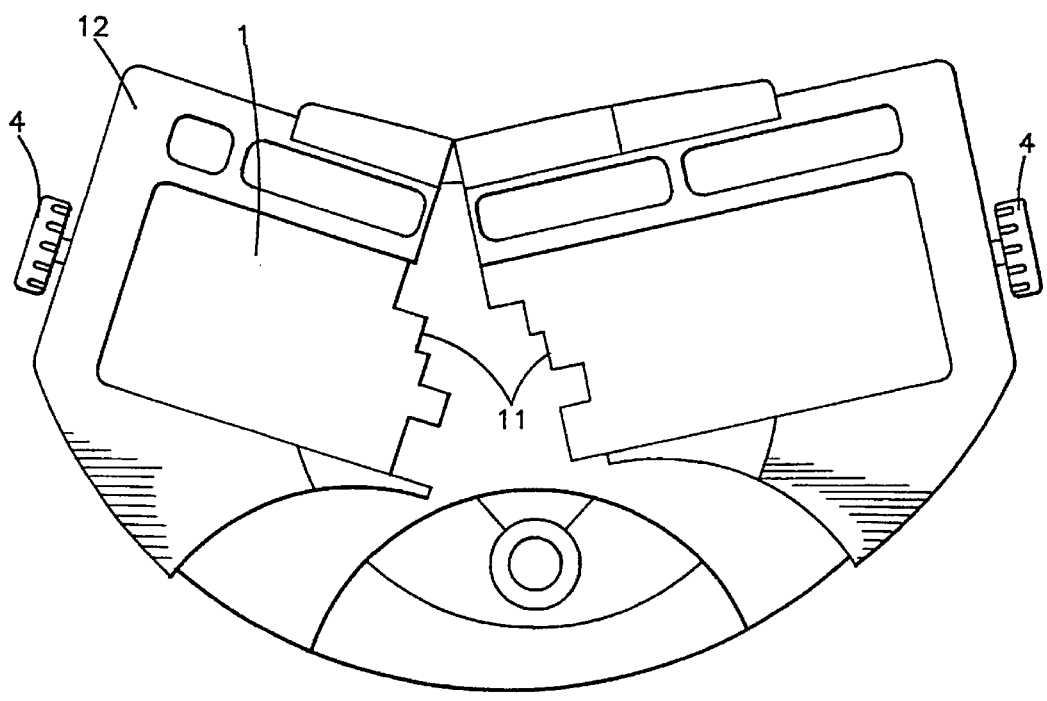
FIG. 10 is another plain view of the detachable keyboard of FIG. 2, showing the key pads of the two symmetrical units separated from each other.

Referring to FIGS. 9 and 10, the upper and intermediate frames 5 and 6 and the key pad 1 are connected together and can be moved on the lower frame 7 horizontally along the curved sliding grooves 71, 72, 73. When stopped, the toothed locating block 66 is engaged with the pawl 7510 of the retainer spring 751 again to retain the keyboard in the adjusted position.

Referring to FIGS. 5 and 6, when the adjusting screw 4 is turned in one direction, the actuating member 3 is forced to move forwards, causing the lifting member 2 turned upwards, and therefore the key pad 1 lifted from a horizontal position to a sloping position. On the contrary, when the adjusting screw 4 is turned in the reversed direction, the actuating member 3 is forced to move backwards, causing the lifting member 2 turned downwards, and therefore the key pad 1 is lowered from the sloping position to the horizontal position.

While only one embodiment of the present invention has been shown and described, it will be understood that various modifications and changes could be made without departing from the spirit and scope of the invention.

What is claimed is:

1. A detachable keyboard comprising:

a key pad consisting of a key switch mounting plate to hold series of key switches, and a cover shell covered on said key switch mounting plate, said key switch mounting plate having a plurality of connecting blocks, two pivot holes on said connecting blocks at two opposite sides, and a plurality of retaining holes;

an intermediate frame having a half-round axle holder at one end, a recess, a locating groove spaced between the half-round axle holder and recess of said intermediate frame, a longitudinal groove extended from the locating groove of said intermediate frame, two angle rails raised from two opposite sides of said recess and defining a respective sliding way;

an upper frame fastened to said intermediate frame by screws, having an opening, a half-round axle holder fitting over the half-round axle holder on said intermediate frame, a locating groove fitting over the locating groove on said intermediate frame, a longitudinal groove fitting over the longitudinal groove on said intermediate frame, and two retainer rods respectively fastened to the retaining holes on said key switch mounting plate;

an actuating member received between said upper frame and said intermediate frame, having two guide blocks spaced at one end and moved in the sliding ways of said angle rails, a screw holder at an opposite end, and an elongated slot extended from the screw holder of said actuating member, the guide blocks of said actuating member having a respective pivot pin at an inner side, the screw holder of said actuating member having two raised portions at two opposite sides respectively moved in the longitudinal grooves of said upper and intermediate frames;

a lifting member having two pivot holes longitudinally aligned and bilaterally disposed at one end and pivotably connected to the pivot pins of the guide blocks of said actuating member, a forked coupling portion at an opposite end extended out of the opening on said upper frame, and two pivot pins disposed at two opposite sides of the forked coupling portion of said lifting member and respectively inserted into the pivot holes on the connecting blocks of said key switch mounting plate; and an adjusting screw having a plain rod section at one end received in the half-round axle holders of said upper and intermediate frames, a screw rod section at an opposite end threaded into the screw holder and elongated slot of said actuating member, and a collar connected between said plain rod section and said screw rod section and received within the locating grooves of said upper and intermediate frames;

wherein when said adjusting screw is turned in one direction, said actuating member is forced forwards to turn said lifting member upwards, causing said key pad lifted from a horizontal position to a sloping position; when said adjusting screw is turned in the reversed direction, said actuating member is forced backwards to turn said lifting member downwards, causing said key pad lowered from said sloping position to said horizontal position.

2. The detachable keyboard of claim 1 further comprising a horizontal adjustment mechanism for adjusting the position of said key pad horizontally, said horizontal adjusting mechanism comprising:

a lower frame having a plurality of curved sliding grooves, a plurality of holes respectively disposed in said curved sliding grooves at one end, and a retainer spring, said retainer spring having one end terminating in a pawl end;

a plurality of guide blocks raised from said intermediate frame and moved in said curved sliding grooves of said lower frame fox permitting said intermediate frame to be moved on said lower frame horizontally along said curved sliding grooves;

a toothed locating block raised from said intermediate frame and engaged with the pawl of said retainer spring; and a bottom shell fastened to said lower frame at a bottom by screws, having a plurality of stop blocks respectively fitted into the holes on said lower frame.

\* \* \* \* \*